Nov. 12, 1963    B. TELISCHI    3,110,174
TEST DEVICE FOR EARTH WORKING TOOL
Filed Sept. 5, 1961
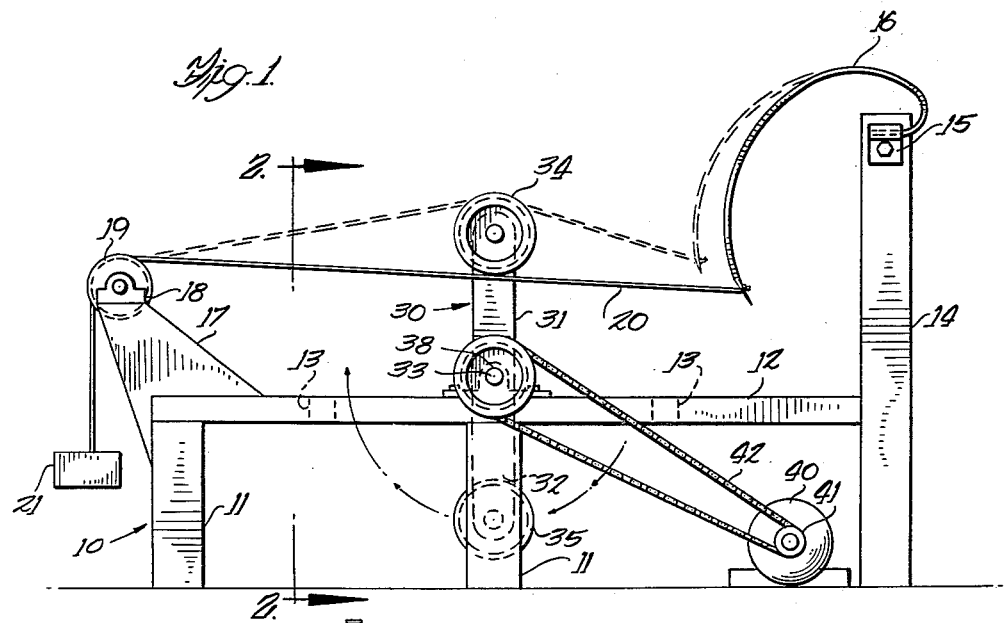
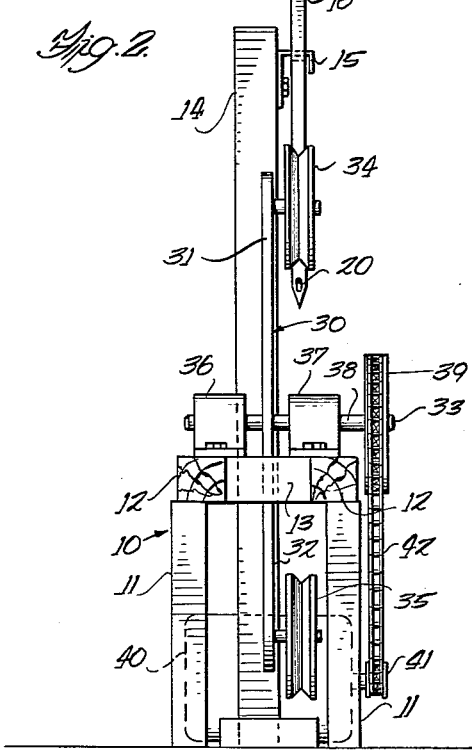
Inventor
Baba Telischi
Paul O. Pippel
Attorney

United States Patent Office 3,110,174
Patented Nov. 12, 1963

3,110,174
TEST DEVICE FOR EARTH WORKING TOOL
Baba Telischi, La Grange, Ill., assignor to International Harvester Company, Chicago, Ill., a corporation of New Jersey
Filed Sept. 5, 1961, Ser. No. 135,811
5 Claims. (Cl. 73—100)

This invention relates generally to a testing fixture for flexible members, and more particularly to a fixture whereby the teeth of a spring tooth harrow are subjected to combined static and dynamic loading.

The general purpose of this invention is to provide a fixture which will impart forces to the spring tooth harrow teeth that will, as nearly as possible, simulate the type of loading these teeth will receive in actual use.

A more specific object of the invention is to provide a test fixture which will develop a dynamic load, in addition to a static load, by means of a novel roller cam arrangement.

These and other objects will become more apparent from the specification and drawings wherein:

FIGURE 1 is a side elevational view of a preferred embodiment of the invention; and FIGURE 2 is a cross sectional view taken along line 2—2 of FIGURE 1.

Describing the invention in detail, reference numeral 10 refers generally to a relatively stationary frame, which consists of spaced apart leg members 11, longitudinally extending rail members 12, and transversely extending cross brace members 13. Integrally mounted at one end of said frame is a vertically extending upright or supporting beam 14. Clamp 15 is fixed to the upper end of upright 14, and tightly holds one end of a spring tooth 16.

Bracket 17 is mounted on the opposite end of the frame from upright 14, and contains spaced apart bearing blocks 18, only one of which is shown. Rotatably mounted in said bearing blocks is a pulley 19, which is horizontally removed from and in general horizontal alignment with the free end of spring tooth 16. A flexible and relatively inextensible cable 20, such as steel or the like, is trained over pulley 19 and is secured at one end to the free end of spring tooth 16. The opposite end of cable 20 is secured to a holding or tautening means, which may either be fixed, or yieldable. Weight 21 is illustrative of yieldable holding means in the preferred embodiment. The holding means is of a magnitude to apply to the spring tooth a static rearward bending stress comparable to the ground force acting on the tooth during operation.

Dynamic loading of the spring tooth is achieved by the swingable roller cam member generally indicated by reference numeral 30. The roller cam member consists of cam arms 31 and 32 extending in opposite directions from axis 33, and having pulleys or sheaves 34 and 35 rotatably mounted thereon. Bearing blocks 36 and 37 are mounted on the frame at a location between said pulley 19 and upright 14. Shaft 38 is rotatably journaled in said bearing blocks, and has mounted thereon roller cam member 30 and sprocket 39. Drive means comprising a motor 40, a sprocket 41 mounted on the output shaft of the motor, and an endless chain 42 are provided for rotating shaft 38.

Cam arms 31 and 32 are of such length that upon rotation of shaft 38, pulleys 34 and 35 will sharply engage and deflect cable 20, thereby accelerating weight 21 upwardly against the force of gravity, and causing a dynamic load to be applied to spring tooth 16. As is obvious from the drawings, pulleys 34 and 35 will each engage cable 20 once for each revolution of shaft 38.

The amplitude or amount of dynamic loading can be varied by changing the height of axis 33, or by changing the size of pulleys 34 and 35. The frequency of the dynamic loading can be varied by adjusting the speed of motor 40, or by changing the size of sprockets 39 or 41.

It will be understood that a preferred form of the invention has been shown and that various other forms will be readily apparent to those skilled in the art within the scope of the appended claims.

What is claimed is:

1. Testing apparatus for applying a combined static and dynamic load to a flexible elongated element, comprising a relatively stationary frame member having means for securing thereto one end of the elongated element, pulley means mounted on said frame, a flexible cable cooperating with said pulley means and having one end secured to the free end of said elongated element, holding means connected to the other end of said cable for holding the cable taut and thereby exerting on said element through the cable a static force transversely of the longitudinal axis of the element sufficient to create in the element a bending stress, a swingable member rotatably mounted on the frame, and means for rotating said swingable member, said swingable member having an arm revolvable about the axis of said member and a part thereon engageable with said cable at each revolution of the member to vertically deflect the cable and thereby apply additional bending stress to the elongated element.

2. The invention set forth in claim 1, wherein said holding means is yieldable upon engagement of said part with said cable.

3. The invention set forth in claim 2, wherein said holding means comprises a weight secured to said other end of said cable.

4. Testing apparatus for applying a combined static and dynamic load to flexible spring harrow teeth, comprising a relatively stationary frame having means for securing thereto one end of a spring tooth, pulley means rotatably mounted on the frame at a location horizontally removed from and in general horizontal alignment with the free end of the tooth, a relatively inextensible flexible cable having one end anchored to the free end of the tooth and its other end trained over said pulley, a weight secured to said other end of the cable adapted to apply to the tooth a rearward bending stress comparable to the ground force acting on the tooth during operation, a member mounted on the frame between the tooth and said pulley for swinging in a circular path, means for driving said member, said member having at least one part adapted to sharply engage and vertically deflect the portion of said cable extending between the tooth and the pulley at each revolution of said member and thereby apply a dynamic load against the resistance of the tooth and the static load of said weight.

5. The invention set forth in claim 4 wherein said member is a bar centrally pivoted on the frame to provide oppositely projecting arms each of which has a roller at its end, one of which rollers is adapted to strike the cable at each half revolution of the bar.

References Cited in the file of this patent

UNITED STATES PATENTS

| | | |
|---|---|---|
| 889,993 | Vaughan et al. | June 9, 1908 |
| 1,906,340 | Scott | May 2, 1933 |
| 1,952,953 | Templin | Mar. 27, 1934 |
| 1,991,854 | Johansson | Feb. 19, 1935 |
| 2,291,086 | Lessig | July 28, 1942 |
| 2,545,816 | Koester et al. | Mar. 20, 1951 |